Sept. 20, 1932. J. G. SOUTHER 1,878,198
APPARATUS FOR FREEZING FOOD PRODUCTS
Filed Dec. 27, 1928
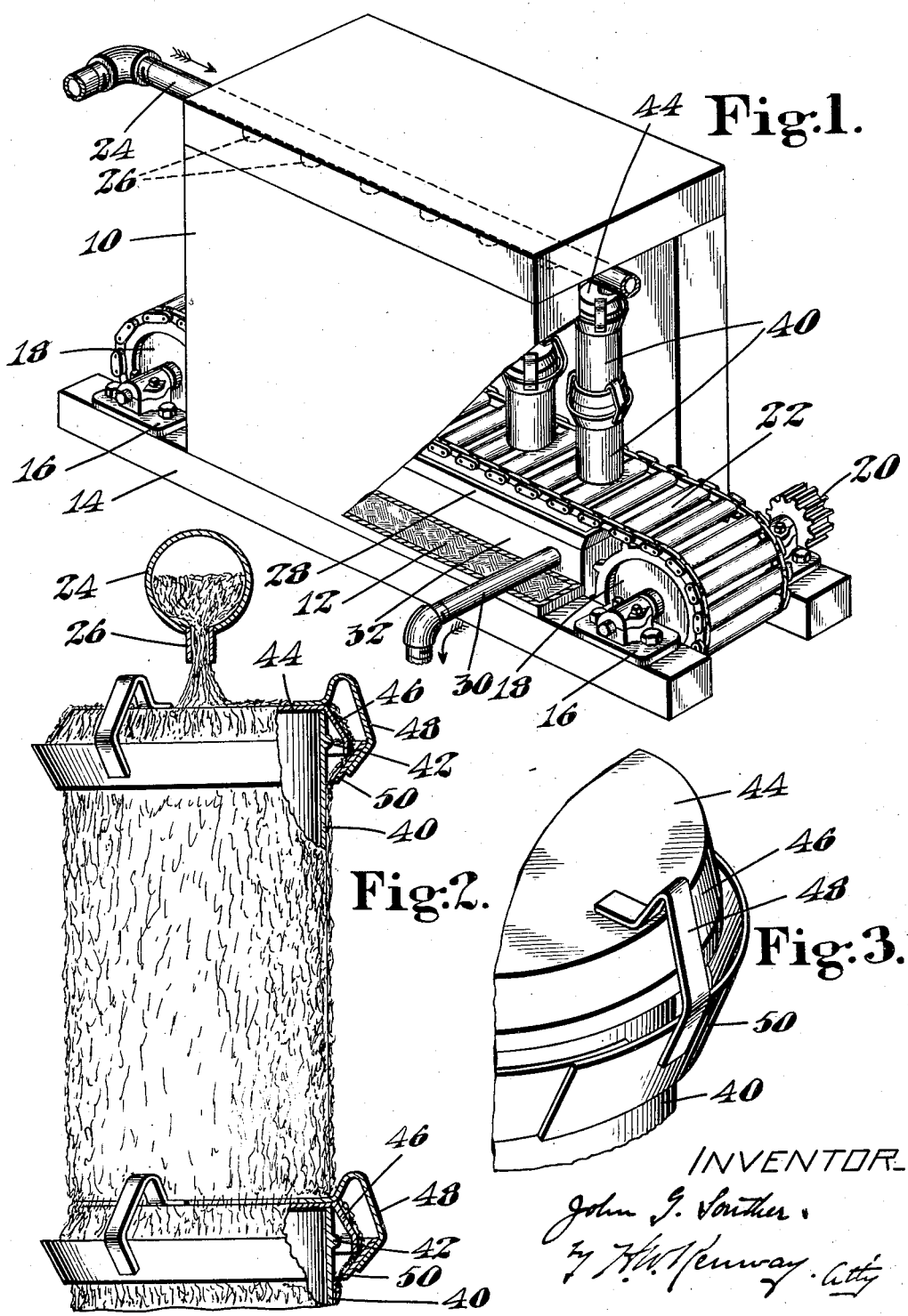

Patented Sept. 20, 1932

1,878,198

UNITED STATES PATENT OFFICE

JOHN G. SOUTHER, OF JAMAICA PLAIN, MASSACHUSETTS, ASSIGNOR, BY MESNE ASSIGNMENTS, TO FROSTED FOODS COMPANY, INC., OF DOVER, DELAWARE, A CORPORATION OF DELAWARE

APPARATUS FOR FREEZING FOOD PRODUCTS

Application filed December 27, 1928. Serial No. 328,706.

This invention relates to improvements in freezing food products. In one aspect it comprises a process of freezing in a manner which imparts new and valuable properties to the frozen food product. In another aspect it consists in improvements in apparatus for carrying out such process.

As an example of one valuable field of use, I will first describe the application of my invention to the manufacture of ice cream. In the commercial manufacture of ice cream, the freezing process is divided into two steps. In the first step, the liquid mixture is agitated while it is being frozen. When chilled or frozen to a certain consistency, it is transferred to a carton or packing can and the freezing or heardening is completed without agitation. The first step is carried out in a freezer, where the mixture is agitated or beaten while its temperature is being reduced. The result of this agitation is to incorporate a certain amount of air in the mixture. The increased viscosity of the cream near its freezing point is sufficient to prevent the escape of the air. Consequently, the mixture may be increased in volume from 50 to 100%. This increase is spoken of as the swell and is essential to a good quality of ice cream.

In the first step, the mixture is frozen just hard enough to retain its swell. No attempt is made to carry the freezing further than this in the freezer, because agitation after the freezing point has been reached will cause the mixture to be beaten down, resulting in a loss of both quantity and quality. At the conclusion of the first step, the ice cream mixture should be viscous enough to retain its swell but thin enough to be poured from one container to another.

In the second step of the process, the partially frozen products of the freezer are placed in metallic containers and stacked in a refrigerated room in which the air is cooled to a temperature of −15° or −20° F. Here the containers are left until the temperature at the center of their contents has been reduced to about 0° F., at which point the product acquires the hardness desirable for distribution. The same process is followed whether the product is delivered in bulk to the containers or whether it is wrapped in cartons and stacked within the container. Under the conditions outlined, the hardening process requires a substantial period of time. It is common for it to take 24 hours to harden the carton bricks and from 36 to 72 hours to harden the product contained in bulk. The result of this relatively slow hardening is to cause the formation of ice crystals in the product. The water contained in the protein jell of the cells diffuses slowly, separating itself from the other ingredients and forming ice crystals which increase in size as the slow freezing continues. The product, therefore, contains ice crystals of a size which give a rough texture to the cream and may be readily detected by the tongue of the consumer. Large needle-like crystals also form on the outer surface of the bricks on account of the slow re-freezing of the surface which becomes slightly melted when the partly frozen mixture is placed in the carton. In addition to the objection to which the ice crystals give rise, the slow process of hardening is objectionable because it deteriorates the composition of the product by separating its component ingredients and affecting the protein content so that it will not smoothly liquefy again on being melted but retains a lumpy consistency.

I have discovered that by carrying out the hardening process under greater temperature difference and more rapidly than heretofore, the objections above discussed are obviated and a product results which is superior in both texture and flavor. While there would be several causes tending to contribute to this desirable result, it appears that the rapid freezing of the product prevents the separation and diffusion of water from the jell contents of the cells and fixes it either as a multitude of finely distributed crystals of infinitesimal size or solidifies the jell with its water in a condition of natural distribution. Whatever the cause may be, the results secured by the method of my invention are novel and extremely desirable. In one aspect, accordingly, my invention consists in the process of hardening or freezing a liquid food substance which consists in subjecting it to a temperature of sufficiently intense cold to harden the liquid without permitting any substantial change in the composition of the cell contents.

My invention also includes within its scope apparatus for freezing food products which may be employed with particular advantage in carrying out the method of my invention. This apparatus is designed to subject the container intimately to a flow of liquid refrigerant at low temperature. Accordingly, in this aspect the invention comprises broadly means for moving a container along a predetermined path, in combination with means for flowing a refrigerant over the container at a station or stations along its path. In one form of such apparatus the container is packed with the food substance to be hardened and then carried automatically to the point at which the refrigerant is discharged without further attention on the part of the operator. After its contents have been completely hardened, the container is carried to a discharging position out of range of the refrigerant and is at once ready for storage or shipment.

In another important aspect, my invention consists in apparatus adapted to handle any tall container for frozen food product or assembly of such containers. By a tall container I mean one having vertical surfaces which afford substantial contact area for a liquid refrigerant as distinguished from the generally flat containers or packages treated in apparatus of the bird's-eye type shown, for example, in the copending application for U. S. Letters Patent Serial No. 290,979. More specifically, the apparatus of my invention is designed to handle the cylindrical containers with which the ice cream industry is now fully equipped. These are known as packing cans and are made of sheet iron, tinned and fitted with a cover. They are usually of a 20-quart capacity and serve not only to contain the ice cream during the hardening process but also as shipping cans and as dispensing cans in soda fountains and the like at their point of destination.

My invention also contemplates a container of novel form, so designed as to prevent leakage of liquid refrigerant into the food product and to insure substantially complete envelopment of the walls of the container by the refrigerant. An important feature of the invention, therefore, comprises a cap or closure for a container, and a deflector arranged to be spaced from the body of the container and so disposed as to cause the refrigerant to flow uniformly into contact with the walls of the container and to follow them to the bottom thereof. By providing such a cap, I am enabled to utilize the standard commercial packing can above referred to as the containers used in my apparatus.

These and other features of the invention will be best understood and appreciated from the following description of the method of carrying it out in connection with the manufacture of ice cream, in which I prefer to employ the apparatus shown in the accompanying drawing, in which Fig. 1 is a view in perspective of the apparatus;

Fig. 2 is a view in elevation, partly in section, on an enlarged scale, of a container subjected to the flow of liquid refrigerant; and Fig. 3 is a fragmentary view in perspective, on a still larger scale, of a portion of one of the containers.

I prefer to employ as a refrigerant calcium chloride brine, chilled to a temperature in the region of $-40°$ F. or even colder, and to apply the brine as a descending stream upon the top and side walls of the container. The illustrated apparatus comprises one mechanical construction for supplying the required brine stream and for conducting the containers into and through the range of the stream.

In Fig. 1, an elongated chamber 10 is shown as having cellular walls and ceiling filled with heat insulating material 12. A pair of parallel beams 14 in the lower part of the chamber 10 carry bearings 16 in which are journaled the drums 18 of a conveyor 22. The conveyor comprises side chains and cross slats which will support and carry the containers and at the same time afford a free passage for the brine flowing over them. The shaft of one conveyor drum carries a pinion 20 by which the conveyor may be driven continuously or intermittently at a slow rate of speed.

In the upper portion of the chamber 10 is located a delivery pipe 24 which is provided with a number of downwardly-directed nozzles 26 through which the brine is discharged vertically upon the containers passing beneath it. Beneath the conveyor is provided an elongated tank or tray 28. This extends for the full length of the conveyor within the chamber 10 and serves to collect the brine escaping from the containers and the conveyor. The tank 28 is supported by a heat insulating slab 32 and is provided with a discharge pipe 30 by which the brine may be drawn off from the apparatus for re-cooling and re-circulation.

The containers which I prefer to employ for ice cream in bulk comprise standard cylindrical open-ended cans 40 of a capacity of about 20 quarts, which regularly are provided adjacent to their open ends with a stiffening bead or rib 42.

The can is closed by a cap 44 of diameter equal to the outside diameter of the can 40 and having an integral outwardly-inclined flange 46 which extends at its lower edge below the rib 42 and acts as a shield to deflect the brine away from the edge of the can. The flange 46, in the form herein shown, comprises an outwardly-flaring portion merging into a cylindrical portion. The entire flange 46 of the cap is spaced from the side walls of the can sufficiently to prevent the possibility of capillary action of the brine by which it might reach the rim of the can. Supported outside the flange 46 and in spaced relation thereto is a deflector element 50 inclined downwardly and inwardly from its upper edge and serving to catch the brine flowing over the flange 46 and direct it back toward the walls of the can 40 so that it will flow smoothly down the latter. The deflector 50 is supported by three straps or angle pieces 48 which, beside supporting the deflector, are bent upwardly above the plane of the cap 44 and act as centering members for locating a second container upon the cap of the first. The ends of the deflector 50 are not permanently connected but overlap, as shown in Fig. 3, so that the whole device may be expanded when the cap is placed on the can 40 and may pass over the rib 42 and contract beneath it. The brine flow is well controlled when the lower edge of the deflector 50 is spaced from the outer wall of the can 40 by about 1/8".

In carrying out my invention with the apparatus herein shown, the ice cream mixture is transferred from the freezer after it has been agitated and reduced in temperature to substantially its freezing point. It is preferable to make the transfer when about one-half of the latent heat of the mixture has been removed, when satisfactory results will be secured. The partially frozen mixture may be transferred in bulk or in separate cartons to cylindrical or rectangular containers, such as the cans 40 which, as already intimated, are the packing cans in commercial use in the ice cream industry. The containers are then placed on the conveyor 22, one standing upon another, as shown in Fig. 1, and in whatever number and arrangement is convenient to the requirements of the case. The conveyor is then set in motion to carry the charge of cans into the range of the brine stream. The brine passing from one of the nozzles 26 flows directly upon the cap 44, as shown in Fig. 2, spreading to the periphery thereof, then outwardly over the flange 46 and then inwardly, as directed by the deflector 50, into contact with the vertical walls of the container. The brine flows down these walls and similarly over the walls of the container located beneath it. Finally, it passes through the conveyor to the tank 28 and is discharged through the pipe 30. The amount and temperature of the brine is regulated to produce a rapid hardening of the ice cream. When the contents are completely hardened, which may be in five or six hours, the conveyor is again set in motion and the cans emerge from the delivery end of the chamber 10, ready for shipment to the consumer.

I have referred in this specification to rapid freezing or hardening. While I am unable to define rapid freezing or hardening in terms of exact temperature or periods of time, the phrase will be readily understood by anyone familiar with the freezing of food substances. Freezing or hardening may take place practically instantaneously, as in liquid air, or it may require days, as in the usual refrigeration of refrigerating rooms. In the case of ice cream, for instance, if the freezing or hardening consumes a substantial period of time, the consistency of the product suffers and it tends to become granular and icy instead of smooth and velvety. By rapid freezing or hardening, I mean hardening in a sufficiently short space of time to avoid this deteriorating tendency.

It will be understood that the method of my invention may be carried out with the assistance of other and different apparatus from that herein shown and that any apparatus which is capable of creating the severe temperature differences required would serve equally as well. While the containers herein shown are cylindrical in shape, it will be understood that I contemplate the use of containers of whatever shape may be best adapted for the product to be hardened. For example, in hardening rectangular cartons, a container of rectangular shape would preferably be employed in order to reduce dead air space to a minimum.

While the invention has been described particularly in connection with the manufacture of ice cream, it could be applied with equal advantage and the apparatus utilized in the freezing of other dairy products, such as cream, or for the freezing of such food substances as liquid egg, for example. In this case and others, the rapid freezing of the protein content materially reduces deleterious change in the composition thereof and maintains it in such condition that it may be smoothly liquefied again without coagulation when it is melted.

In addition to the improvements noted in the quality and texture of the product, the rapid freezing herein disclosed is advantageous from the bacteriological standpoint, in that it reduces the bacteria count of the product to a striking degree as compared with products subjected to slow freezing. The rapid chilling of the food substance prevents the bacteria from increasing by throwing out spores as it would otherwise continue to do throughout a portion of any slow hardening operation. In holding down bacteriological growth in this manner, the heating effect of the bacteria upon the food substance is also eliminated and the time required for hardening further reduced in this respect. It will be understood that in a slow hardening process the food substance at the center of the container is not chilled for some time. During this time, bacteriological growth continues with the incidental creation of heat which, in turn, tends to stimulate further bacteriological growth. In accordance with the rapid freezing of my invention, this undesirable sequence is arrested or substantially eliminated.

Having thus described my invention, what I claim as new and desire to secure by Letters Patent is:

1. Apparatus for freezing food products, comprising a container having a body portion, and a cap supporting an inwardly directed deflector in spaced relation to the body of the container.

2. Apparatus for freezing food products, comprising an open-ended container with a rib adjacent to its open end, a cap having a flange surrounding said rib, and an inwardly directed deflector spaced from the flange.

3. Apparatus for freezing food products, comprising an open-ended container with vertical walls, and a removable cap closing the container, a brine deflector spaced from the periphery of the cap at its upper edge and inclined inwardly and downwardly toward the walls of the container, and means for supporting said deflector in spaced relation to said cap and container.

4. Apparatus for freezing food products, comprising an open-ended container with a rib adjacent to its open end, and a removable cap closing the container and having a spaced deflector expansible to pass over the rib when the cap is being placed on the container.

5. Apparatus for freezing food products, comprising an open-ended container, a removable cap closing the container, a deflector, and means for supporting the deflector in spaced relation to the cap shaped to position a second container upon the cap.

6. In apparatus for freezing food products, a plurality of containers, each having a cap for directing a flow of liquid refrigerant first outwardly and then inwardly with respect to the walls of the container and means for centering one container over another.

7. In apparatus for freezing food products, a container cap having upwardly projecting centering devices adapted to center a container placed thereon and cooperating deflector means for directing the flow of liquid refrigerant from one container to another.

8. A removable, interchangeable cap for cylindrical ice cream packing cans, having a top for closing the can and a spaced concentric brine deflector directed toward the body of the can.

9. A removable, interchangeable cap for cylindrical ice cream packing cans, having a top corresponding in size and shape to the top of the can, and a downwardly extending flange flared outwardly and diverging away from the can downwardly to insure sufficient separation from the can to prevent capillary action between itself and the walls of the can.

10. Apparatus for freezing food products, comprising an open-ended container, a removable cap closing the container, said cap having a flange extending downwardly and flared outwardly in spaced relation to the walls of the container, a deflector spaced from said flange and extending inwardly and downwardly toward the walls of the container, and means for supporting said deflector.

JOHN G. SOUTHER.